US010796350B2

(12) United States Patent
Skulnik et al.

(10) Patent No.: US 10,796,350 B2
(45) Date of Patent: Oct. 6, 2020

(54) SYSTEMS AND METHODS FOR USING FACADE API FOR PHASED UPGRADE OF CORE API

(71) Applicant: ORACLE INTERNATIONAL CORPORATION, Redwood Shores, CA (US)

(72) Inventors: Lukas Skulnik, Brno (CZ); Michal Karasek, Brno (CZ); Pavel Srankota, Dolni Loucky (CZ)

(73) Assignee: Oracle International Corporation, Redwood Shores, CA (US)

( * ) Notice: Subject to any disclaimer, the term of this patent is extended or adjusted under 35 U.S.C. 154(b) by 195 days.

(21) Appl. No.: 15/713,806

(22) Filed: Sep. 25, 2017

(65) Prior Publication Data

US 2019/0095967 A1 Mar. 28, 2019

(51) Int. Cl.
| G06Q 30/06 | (2012.01) |
| G06F 16/00 | (2019.01) |
| G06F 21/57 | (2013.01) |
| H04L 29/08 | (2006.01) |
| G06F 9/46 | (2006.01) |
| G06F 8/658 | (2018.01) |
| G06F 9/54 | (2006.01) |
| G06F 8/65 | (2018.01) |

(52) U.S. Cl.
CPC ......... *G06Q 30/0601* (2013.01); *G06F 16/00* (2019.01); *G06F 21/57* (2013.01); *H04L 67/02* (2013.01); *H04L 69/329* (2013.01); *G06F 9/46* (2013.01); *G06F 2221/2117* (2013.01); *H04L 67/148* (2013.01)

(58) Field of Classification Search
CPC ... G06Q 30/0601; H04L 67/02; H04L 69/239; H04L 67/148; G06F 9/46; G06F 2221/2117
USPC ...................................................... 709/225
See application file for complete search history.

(56) References Cited

U.S. PATENT DOCUMENTS

| 7,558,843 B2 | 7/2009 | Lipscomb et al. | |
| 7,970,901 B2 | 6/2011 | Lipscomb et al. | |
| 8,880,682 B2 * | 11/2014 | Bishop | G06F 11/3495 709/224 |
| 2005/0262091 A1 * | 11/2005 | Marvin | G06F 8/36 |

(Continued)

*Primary Examiner* — Umar Cheema
*Assistant Examiner* — Tony Williams
(74) *Attorney, Agent, or Firm* — Kraguljac Law Group, LLC

(57) ABSTRACT

Systems, methods, and other embodiments associated with a phased release of a core application programming interface (API) are described. In one embodiment, a method includes performing a phased release to remote client devices to upgrade instances of a first core API to a second core API. The example method may also include deploying a facade API into instances of the first core API in response to determining that an API implementation relies upon functionality of the second core API. The facade API is a dummy interface for interacting with the API implementation in place of the functionality of the second core API. The example method may also include performing phased upgrades to upgrade subsets of the remote client devices in phases from the first core API to the second core API, where functionality of the second core API replaces the facade API.

18 Claims, 11 Drawing Sheets

(56) References Cited

U.S. PATENT DOCUMENTS

| | | | |
|---|---|---|---|
| 2007/0168486 A1* | 7/2007 | McCoy | H04L 12/66 709/223 |
| 2012/0124553 A1* | 5/2012 | Eschenroeder | G06F 8/71 717/121 |
| 2014/0040321 A1* | 2/2014 | Cohen | G06Q 30/08 707/803 |
| 2016/0274888 A1* | 9/2016 | Eliazer | G06F 8/658 |
| 2016/0306990 A1* | 10/2016 | Schrock | G06F 9/54 |
| 2017/0006135 A1* | 1/2017 | Siebel | G06F 9/5072 |
| 2017/0187785 A1* | 6/2017 | Johnson | H04L 67/10 |

* cited by examiner

SYSTEMS AND METHODS FOR USING FACADE API FOR PHASED UPGRADE OF CORE API

BACKGROUND

A web-based information platform, such as a multi-tenant business platform, provides a variety of services to clients. The web-based information platform can provide business process tracking functionality, inventory and sales tracking functionality, website building and hosting functionality, accounting functionality, data storage functionality, and/or a variety of other functionality. Instances of a core application programming interface (API) are installed on client devices. The core API provides a user interface through which users can access different functions of the web-based information platform. For example, the core API can comprise a business process tracking interface through which a client can track their business processes. The core API can comprise an accounting interface through which the client can track accounting information.

The web-based information platform can allow developers to create new functionality or use core APIs to customize product behavior, user interfaces, and/or other functionality of the core API, such as through plugins or other add-on functionality. For example, a developer can create a custom API implementation for a merchant website hosted by the web-based information platform for a retailer client. The custom API implementation can be created as a plugin to the core API and can provide a new functionality for the merchant website, such as providing customer email notifications of insufficient fund messages returned during payment processing. Some systems may have many custom API implementations that exist in the core API.

The custom API implementations create issues when the core API is upgraded, for example, during a phased upgrade where different devices or accounts such as tenant accounts, client accounts, customer accounts, and/or merchant accounts are upgraded at different times. A phased upgrade for the core API can be performed to update instances of the core API on groups of client devices at different times/phases to upgrade from a first core API to a newer second core API. However, if the custom API implementation relies upon functionality of the second core API that is not included in the first core API, then the custom API implementation cannot be deployed to client devices that still have the first core API. That is because the custom API implementation will cause an error when trying to operate with the first core API that does not have the functionality. As such, prior upgrade processes did not deploy any custom API implementations until the entire phased upgrade completed for all client devices, which caused the custom API implementations to be unavailable until all client accounts have been upgraded to functionality of the second core API, which can take weeks or months.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
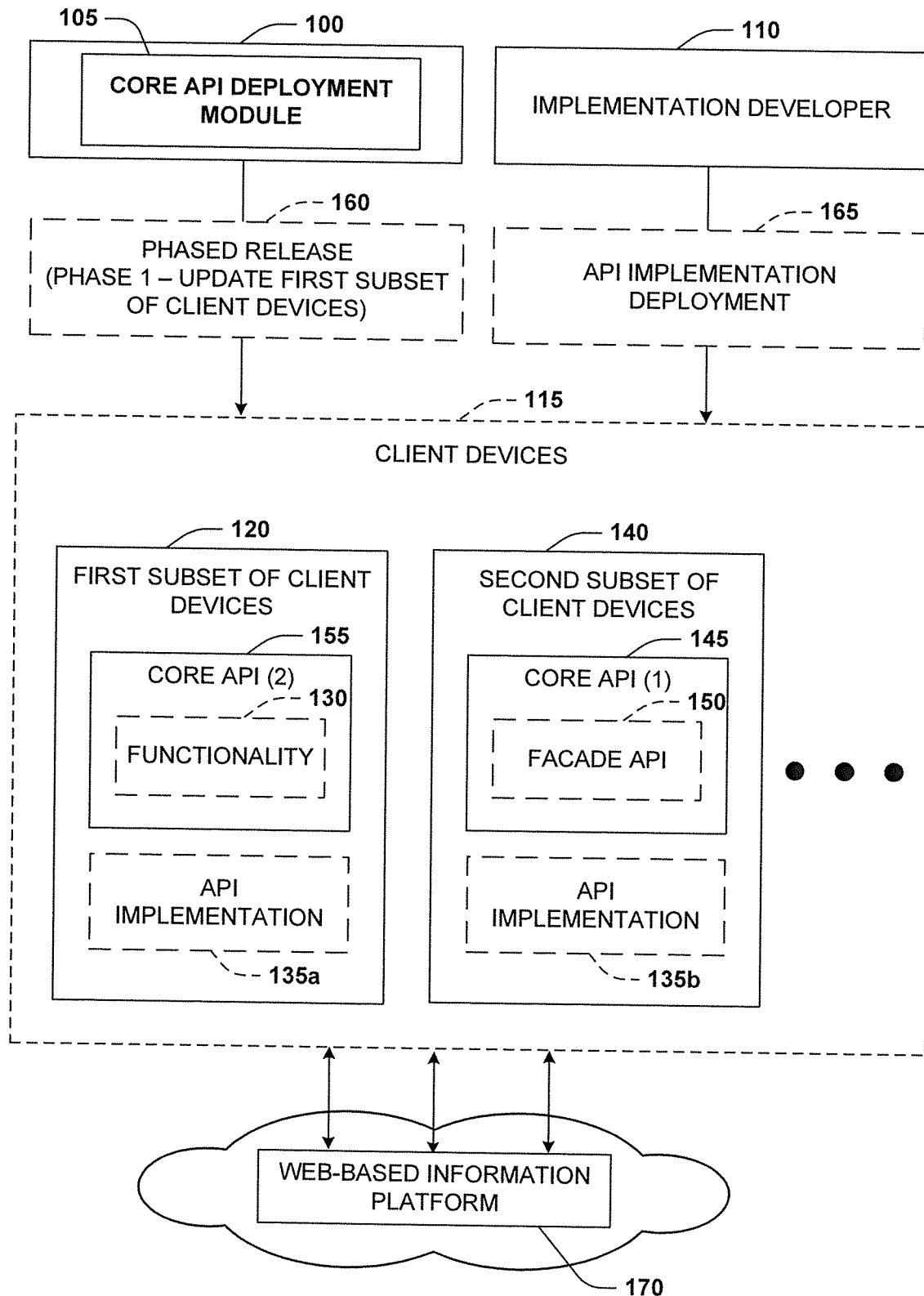
FIG. 1 illustrates an embodiment of a system associated with using a facade of a second core API.

Computerized systems and methods are described herein that implement facade APIs to facilitate a phased upgrade of a core API that includes custom API implementations. A web-based information platform is configured to provide client devices with access, such as through instances of the core API hosted on the client devices, to a variety of services, such as creating and hosting a website, tracking business processes, tracking inventory and sales, etc. In one embodiment, the web-based information platform can be hosted by a distributed cloud computing environment. Instances of the core API are installed on the client devices. The core API can provide user interfaces through which users can access the services provided by the web-based information platform. The platform may include one or more API implementations that are created as a customized way to perform a functionality provided by the core API or as an additional new functionality not natively provided by the core API.

At some point, the core API on the client devices will be upgraded to a newer version. The web-based information platform can perform a multi-phased upgrade of the core API at different client devices at different times. For example, during a first phase, a first subset of client devices are upgraded from a first core API to a newer second core API. During a second phase, a second subset of client devices are upgraded from the first core API to the second core API. In this way, subsets of client devices are upgraded during each phase so that not all client devices are upgraded at once. Performing the upgrade in phases allows issues or other problems to be detected and resolved before all client devices are upgraded, such as after the first phase but before the second phase.

As stated previously, one or more custom API implementations may exist, which can affect the upgrade process. As provided herein, a phase deployment of the API implementation is provided with the phased upgrade of the core API. The API implementation may have been developed around functionality provided by the second core API but not by the first core API. Thus, the API implementation will only properly function with the second core API.

Accordingly, before the phase upgrade starts, a facade API and/or the API implementation are deployed to the client devices. The facade API is deployed into a set of client devices that still operate the first core API. The facade API is a placeholder (e.g., a dummy interface) for functionality of the second core API that is relied upon by the API implementation such as where the API implementation will call methods provided by the functionality of the second core API. The facade API will be discussed in more detail below. Since the facade API does not comprise the actual functional code of the methods, the facade API is configured to merely receive calls from the API implementation. Then in response to the call, the facade API is configured to return a success message, a message that the functionality has not yet been made available, or some other return value so that the API implementation does not crash or cause errors due to the actual functionality not existing in the first core API.

As client devices are upgraded to the second core API, the API implementation at those client devices will be able to access the functionality of the second core API instead of merely accessing the facade API of the first core API. Otherwise, the API implementation at client devices still hosting the first core API will continue to access the facade API. Those API implementations are not fully functional but will not cause errors or crashes because the facade API can at least respond to calls from the API implementations.

In one embodiment, the phased release is performed for the remote client devices to upgrade instances of the first core API to the second core API. The facade API is deployed into instances of the first core API in response to determining that the API implementation relies upon functionality of the second core API. The facade API is a dummy interface for interacting with the API implementation in place of the functionality of the second core API. The facade API is configured to receive functional calls from the API implementation, and response back in a manner that does not cause the API implementation to crash, such as by responding with a dummy success message or a message that the functionality of the second core API is not yet implemented because the first core API has not yet been upgraded to the second core API. API upgrades are performed by the present API deployment system to upgrade subsets of the remote client devices in phases from the first core API to the second core API. Upon completion of a phased upgrade for a remote client device, functionality of the second core API replaces the facade API at the remote client device. In this way, subsets of remote client devices are upgraded to the second core API in phases.

With reference to FIG. 1, one embodiment of a computer system 100 is illustrated that implements an upgrade and deployment system using facade APIs as part of a phased upgrade of a core API. The computer system 100 includes a core API deployment module 105, which can be configured to execute on a computer, such as computer 615 of FIG. 6. In one embodiment, the computer system 100 is hosted within the web-based information platform 170. In another embodiment, the computer system 100 is hosted on a device external to the web-based information platform 170.

In one embodiment, the computer system 100 and/or a web-based information platform 170 are hosted within a distributed cloud computing environment, such as a multi-tenant architecture that is used to develop and provide Internet/web-based services and business applications for end users. The multi-tenant architecture allows multiple accounts (tenants) and users to store and access data, and to utilize specific applications that reside on a remote platform having the multi-tenant architecture, such as the web-based information system 170. The remote platform can be implemented as a set of servers or server groups that provide use of the multi-tenant architecture as a service to the accounts and users of each account. The services can provide data storage, computational processing power, data analytics, applications, and/or other Software-as-a-Service (SaaS), cloud-based services, web-services, or remote in the cloud services. In one embodiment, the multi-tenant architecture can be used to develop, store, maintain, edit, and host a website that can be provided to remote devices of users.

For the following description, assume that instances of a first core API 145 are deployed onto a group of client devices 115. The first core API 145 provides users with access to services provided by the web-based information platform 170, such as to accounting services, business process services, inventory and sales tracking services, website creation and hosting services, etc. A phased upgrade may be planned for upgrading the first core API 145 to a second core API 155 at some point in time. The second core API 155 may include new functionality not provided by the first core API 145, such as a Payment API for processing customer transactions generated through websites hosted by the web-based information platform 170. An implementation developer 110 can create API implementations that add additional functionality to the second core API 155 and/or customize functionality of the second core API 155, such as API implementation(s) 135a,b to add email notification functionality to the Payment API so that emails are sent to customers when their accounts have insufficient funds for a purchase. In one embodiment, the API implementation(s) 135a,b can be created as a plugin for the second core API 155. Because the Payment API is not included within the first core API 145, the API implementation(s) 135a,b could crash when hosted on a client device not yet upgraded to the second core API 155.

Accordingly, the core API deployment module 105 is configured to deploy a facade API 150 into instances of the first core API 145 on one or more client devices 115 before starting the phased release 160 of the second core API 155. In one embodiment, the facade API 150 is a placeholder for functionality of the second core API 155, such as a placeholder for the Payment API. As a placeholder, the facade API functions as a dummy interface that receives calls to the functionality but does not actually perform the functionality. In one embodiment, the facade API 150 is configured to include a facade method that has a method name matching a method name of a method comprised within the functionality of the second core API 155. In one embodiment, the facade method has the same method name as a method provided by the Payment API so that the facade API receives calls to the Payment API, but does not comprise the actual method code of the method. Thus, the facade API 150 does not comprise the actual method body, code, and/or functionality of the Payment API. In one embodiment, the facade API method is configured with an empty method body. In another embodiment, the facade method is configured with a return function in place of the method body of the method comprised within the Payment API. The return function, in response to being called, is configured to return an indication that the functionality is not yet implemented, generate and transmit a success message even though the function is not performed, or generate and transmit some other return value so that the API implementation(s) 135a,b calling the non-existing Payment API does not crash or produce an error or an exception.

With continued reference to FIG. 1, block 165 represents the implementation developer 110 deploying instances of the API implementation(s) 135a,b to the client devices 115, such as before or during the phased release 160.

Once instances of the facade API 150 and/or the API implementation(s) 135a,b are deployed to the client devices 115, the core API deployment module 105 may initiate the phased release 160. The client devices 115 may be composed of a first subset 120 of the client devices 115, a second subset 140 of the client devices 115, and/or other subsets of the client devices 115. A first phase of the phased release 160 is performed on the first subset of client devices 120 to upgrade instances of the first core API 145 to the second core API 155, as illustrated in FIG. 1 as "Core API (2) 155." The second core API 155 comprises functionality 130 that is relied upon by the API implementation(s) 135a,b, such as where the Payment API comprises methods called by the API implementation(s) 135a,b.

In one embodiment of performing the upgrade, a method body of a method of the functionality 130 of the second core API 155 is inserted into a method body of the facade API. In this way, the facade API now comprises the method code of the method of the functionality 130. In another embodiment of performing the upgrade, a database scheme, programming code, and/or scripting code of the first core API 145 are modified, replaced, removed, or added to. In another embodiment, a first database schema of the first core API 145 and a second database schema of the second core API 155 are used during the first phase until the upgrade is complete. Operations using functionality of the first core API 145 that is not in the second core API 155 are directed to the first database schema, first programming code, and/or first scripting code of the first core API 145. Operations using functionality of the second core API 155 that is not in the first core API 145 are directed to the second database schema, second programming code, and/or second scripting code of the second core API 155.

After completion of the first phase, the first subset 120 of the client devices 115 comprises the second core API 155 while the second subset 140 and/or other subsets of the client devices 115 still comprise the first core API 145, as illustrated in FIG. 1. Thus, instances of the API implementation 135a at the first subset 120 of the client devices 115 will be able to execute and utilize the functionality 130 of the second core API 155. However, instances of the API implementation 135b at the second subset 140 of the client devices 115 will merely have access to the facade API 150 of the first core API 145. During a subsequent phase, instances of the first core API 145 at the second subset 140 of the client devices 115 are upgraded to the second core API 155. Thus, instances of the API implementation 135b at the second subset 140 of the client devices 115 will be able to execute and utilize the functionality 130 of the second core API 155 after the second phase. In this way, the phased release 160 is performed to upgrade instances of the first core API 145 to the second core API 155 while allowing the API implementation(s) 135a,b to be deploy before the phased release 160 is complete without introducing errors and/or causing crashes otherwise resulting from the API implementation(s) 135a,b making calls to methods, APIs, and/or other functionality 130 not yet available due to the first core API 145 not comprising such functionality 130. This is because the facade API 150 is capable of intercepting and responding to calls for such functionality 130 even though the facade API 150 does not comprise actual programming code and methods of the functionality 130.

In one embodiment, feedback is received from a client device of the first subset 120 of the client devices 115 after the first phase is complete but before the second phase has started. The feedback can relate to operation of the functionality 130, such as an error that occurs when the API implementation(s) 135a,b attempts to invoke a method within the Payment API. In this way, the feedback can be used to modify the second core API 155 before other phases are performed. Thus, the error can be addressed before the entire phased release 160 has completed.

Figure 2:
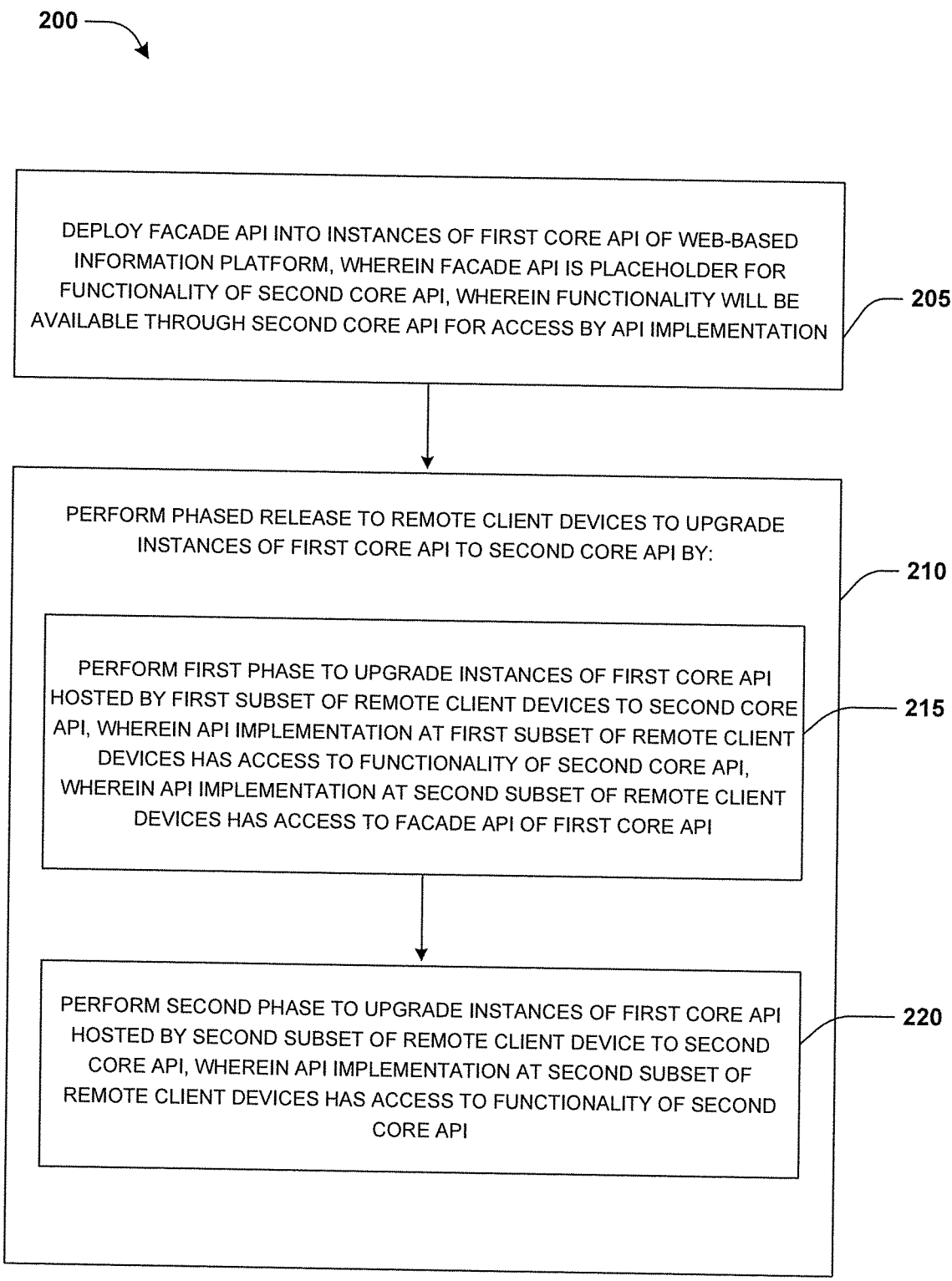
FIG. 2 illustrates an embodiment of a method associated with using a facade of a second core API.

With reference to FIG. 2, one embodiment of a computer implemented method 200 is illustrated that is configured to perform a phased release of a core API. In one embodiment, the method 200 is performed by the core API deployment module 105 utilizing various computing resources of the computer 615, such as the processor 620 for executing instructions associated with performing the phased release. Memory 635 and/or disks 655 are used for storing an upgrade used to upgrade the core API and/or other data. Network hardware is used for communicating data structures and/or other data between the computer 615 and remote computers over a network. The method 200 is triggered upon receiving a command to perform the upgrade.

Upon receiving the command to perform the upgrade, a determination is made that an API implementation replies upon functionality of the second core API that is not included within the first core API. Thus, a facade API that is a dummy interface for interacting with the API implementation can be used in place of the functionality of the second core API so that the API implementation does not crash when interfacing with the first core API. Accordingly, a facade API is deployed into instances of a first core API associated with a web-based information platform, at 205. The instances of the first core API are hosted by remote client devices of the web-based information platform. The facade API is a placeholder for functionality of a second core API. The functionality will be available through the second core API for access by the API implementation to execute a method comprised within the functionality. Thus, the API implementation relies upon programmatic execution of the method of the functionality available through the second core API in order to fully function.

At 210, a phased release is performed to the remote client devices to upgrade the remote client devices from the first core API to the second core API. At 215, the phased release comprises a first phase that upgrades instances of the first core API hosted by a first subset of the remote client devices to the second core API. The API implementation at the first subset of the remote client devices now has access to the functionality of the second core API hosted by the first subset of the remote client devices. The API implementation at the second subset of the remote client devices merely has access to the facade API of the first core API hosted by the second subset of the remote client devices.

At 220, a second phase is performed to upgrade instances of the first core API hosted by the second subset of the remote client devices to the second core API. The API implementation at the second subset of the remote client devices now has access to the functionality of the second core API hosted by the second set of client devices.

Figure 3:
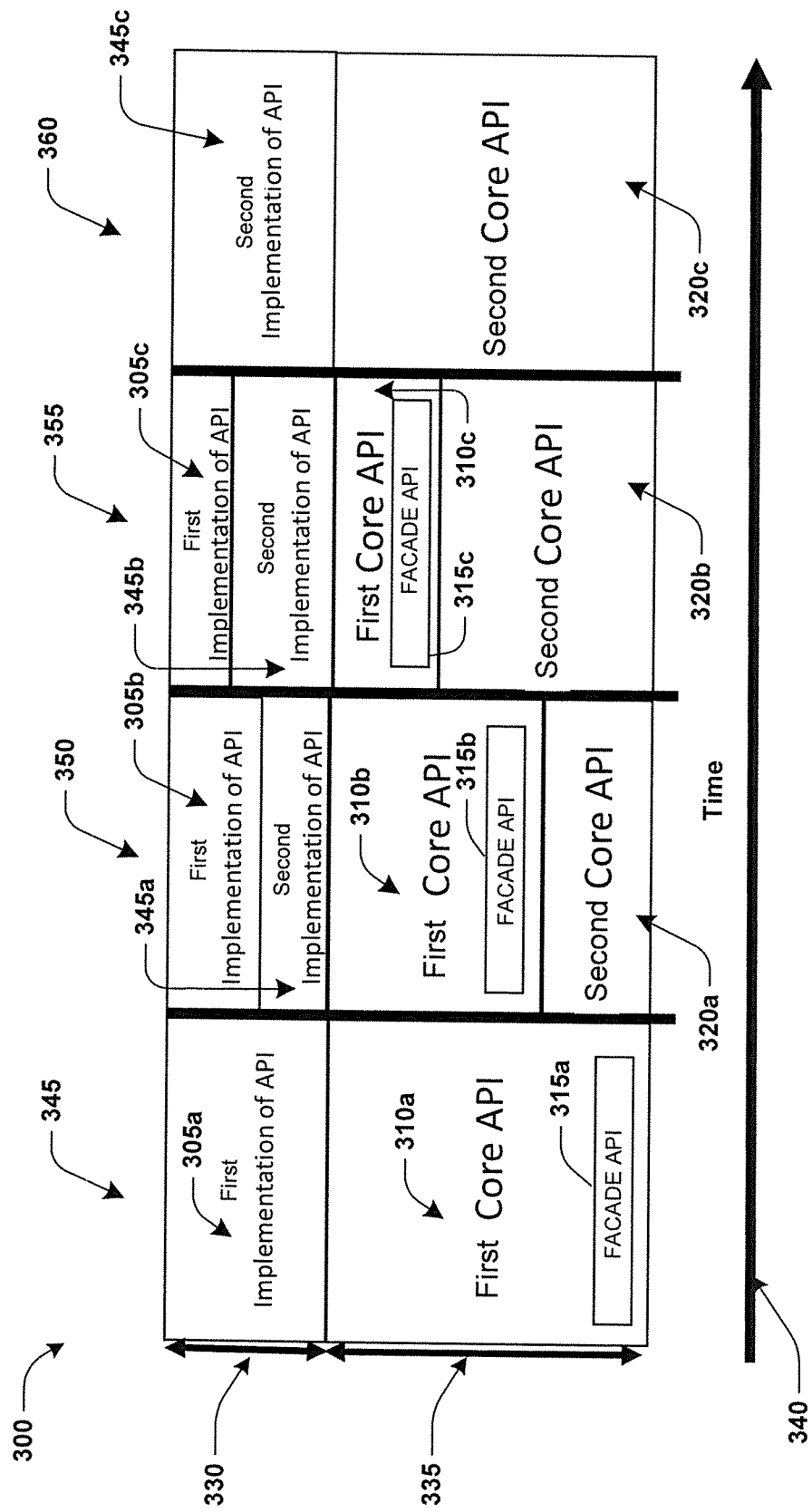
FIG. 3 illustrates an embodiment of a method flow of using a facade of a second core API.

With reference to FIG. 3, one embodiment of the method 200 of FIG. 2 is illustrated by a method flow 300 of a phased release of a core API over a release time period 340. The method flow 300 comprises a first representation 330 of a percentage of client devices that are using fully functionality instances of a first (older) API implementation compared to client devices that are using fully functionality instances of a second (newer) API implementation. The first API implementation may relate to an implementation/customization of a first API provided by a first (older) core API. The second API implementation may relate to an implementation/customization of a second API provided by a second (newer) core API. The method flow 300 comprises a second representation 335 of a percentage of client devices that are hosting the first (older) core API compared to client devices that are hosting the second (newer) core API.

During a pre-upgrade phase 345, a first percentage 305a, such as 100%, of client devices are hosting the first API implementation and a first percentage 310a, such as 100%, of the client devices are hosting the first core API. During the pre-upgrade phase 345, facade API(s) 315a,b,c, are deployed into the instances of the first core API. The facade API(s) 315a,b,c are a placeholder for functionality of the second core API, such as the second API that is relied upon by the second API implementation. In one embodiment, the facade API(s) 315a,b,c comprise a method name of the second API, but not method body code of the second API. In this way, the facade API(s) 315a,b,c can be called by the second API implementation in place of the second API without causing errors or crashes but without providing functionality of the second API. In one embodiment, the second API implementation is deployed to the client devices, but no client devices are yet using a fully functionality instance of the second API implementation because the second API is not yet available to the second API implementation.

A first phase 350 is performed to upgrade the first core API at a first subset of the client devices (e.g., 30% of the client devices) to the second core API comprising the second API used by the second API implementation for full functionality. At completion of the first phase 350, a second percentage 310b, such as 70%, of client devices (e.g., client devices not in the first subset) are hosting the first core API and a third percentage 320a, such as 30%, of client devices are hosting the second core API (e.g., client devices in the first subset). Accordingly, a second percentage 305b, such as 70%, of client devices (e.g., client devices not in the first subset) are actively hosting functionality of the first API implementation through the first core API (e.g., the second API implementation on such client devices are not fully functional and are merely accessing the facade API(s) 315a,b,c). Also, a third percentage 345a, such as 30%, of client devices (e.g., client devices in the first subset) are actively hosting full functionality of the second API implementation through the second core API because the second API implementation can access the second API of the second core API.

A second phase 355 is performed to upgrade the first core API at a second subset of the client devices (e.g., an additional 30% of the client devices) to the second core API comprising the second API used by the second API implementation for full functionality. At completion of the second phase 355, a fourth percentage 310c, such as 40%, of client devices (e.g., client devices not in the first subset and the second subset) are hosting the first core API. A fifth percentage 320b, such as 60%, of client devices are hosting the second core API (e.g., client devices in the first subset and the second subset). Accordingly, a fourth percentage 305c, such as 40%, of client devices (e.g., client devices not in the first subset and the second subset) are actively hosting functionality of the first API implementation through the first core API (e.g., the second API implementation on such client devices are not fully functional and are merely accessing the facade API(s) 315a,b,c Also, a fifth percentage 345b, such as 60%, of client devices (e.g., client devices in the first subset and the second subset) are actively hosting full functionality of the second API implementation through the second core API because the second API implementation can access the second API of the second core API.

A third phase 360 is performed to upgrade the first core API at a third subset of the client devices (e.g., a remaining 40% of client devices not yet upgraded) to the second core API comprising the second API used by the second API implementation for full functionality. At completion of the third phase 360, no client devices are hosting the first core API and all client devices have been upgraded to the second core API. Thus, a sixth percentage 320c, such as 100%, of client devices are hosting the second core API. A sixth percentage 345c, such as 100%, of client devices are hosting fully functional instances of the second API implementation that now have access to the second API of the second core API. In this way, the phased release is performed.

Figure 4A:
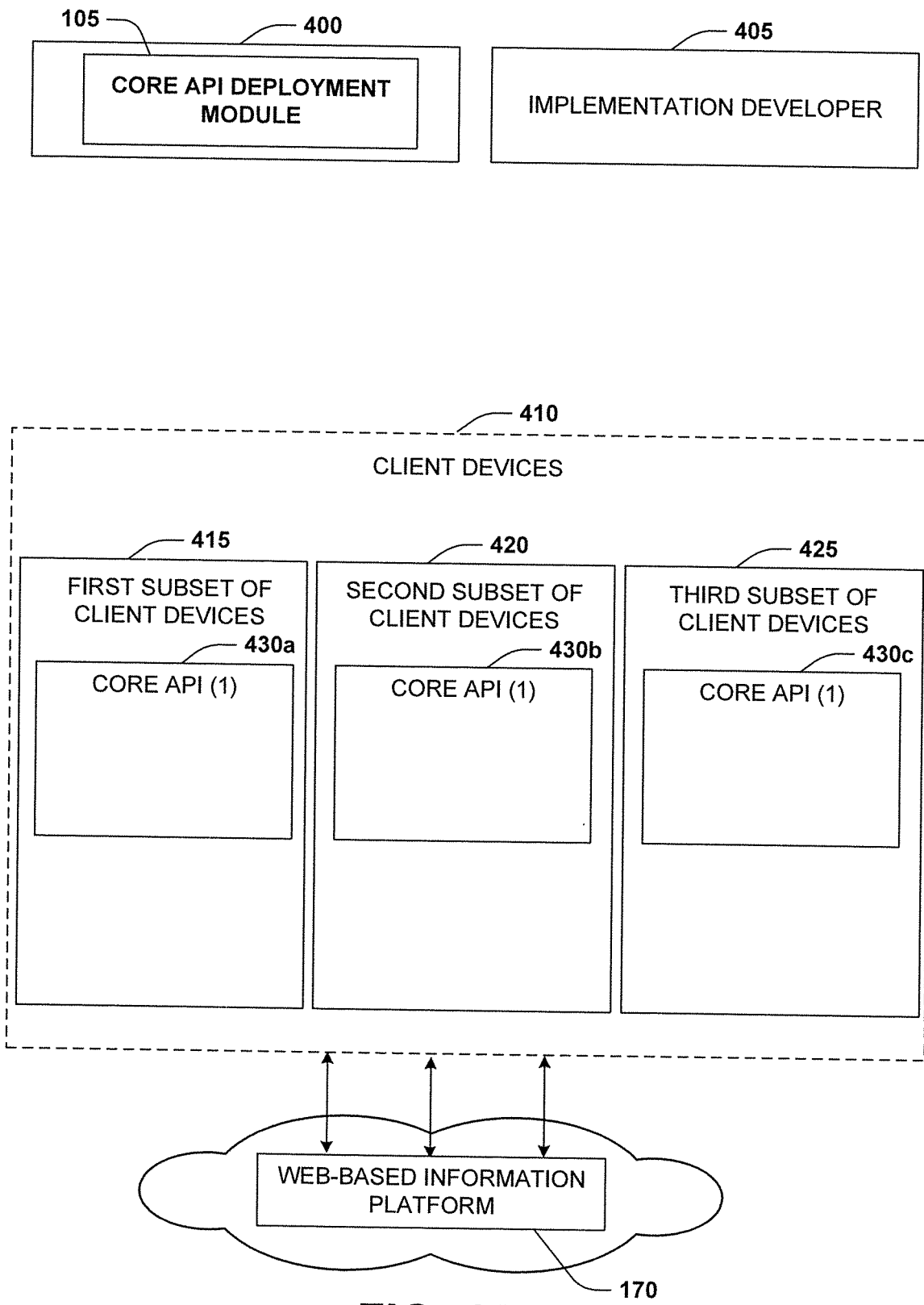
FIG. 4A illustrates an embodiment of a system associated with using a facade of a second core API.

With reference to FIGS. 4A-4F, one embodiment of a system 400 for performing a phased upgrade of a core API is illustrated. A plurality of remote client devices 410 can access services of a web-based information platform 170 through instances of first core API(s) 430a,b,c, as illustrated in FIG. 4A. The plurality of remote client devices 410 may be comprised of a first subset 415 of the plurality of remote client devices 410, a second subset 420 of the plurality of remote client devices 410, and a third subset 425 of the plurality of remote client devices 410. In one embodiment, the first core API(s) 430a,b,c provide a user interface used to access inventory and sales tracking information provided by the web-based information platform 170.

A core API deployment module 105 is configured to perform a phased release to upgrade the plurality of remote client devices 410 from the first core API(s) 430a,b,c to second core API(s) 460a,b,c that provides functionality 465a,b,c not provided by the first core API(s) 430a,b,c, such as an ability to send social network messages to shoppers of shopping websites hosted by the web-based information platform 170 for clients of the web-based information platform 170. An implementation developer 405 is allowed by the web-based information platform 170 to develop API implementations for the second core API(s) 460a,b,c, such as API implementation(s) 450a,b,c that uses the functionality 465a,b,c of the second core API(s) 460a,b,c to send social network messages to shoppers regarding their sales order statuses.

Figure 4B:
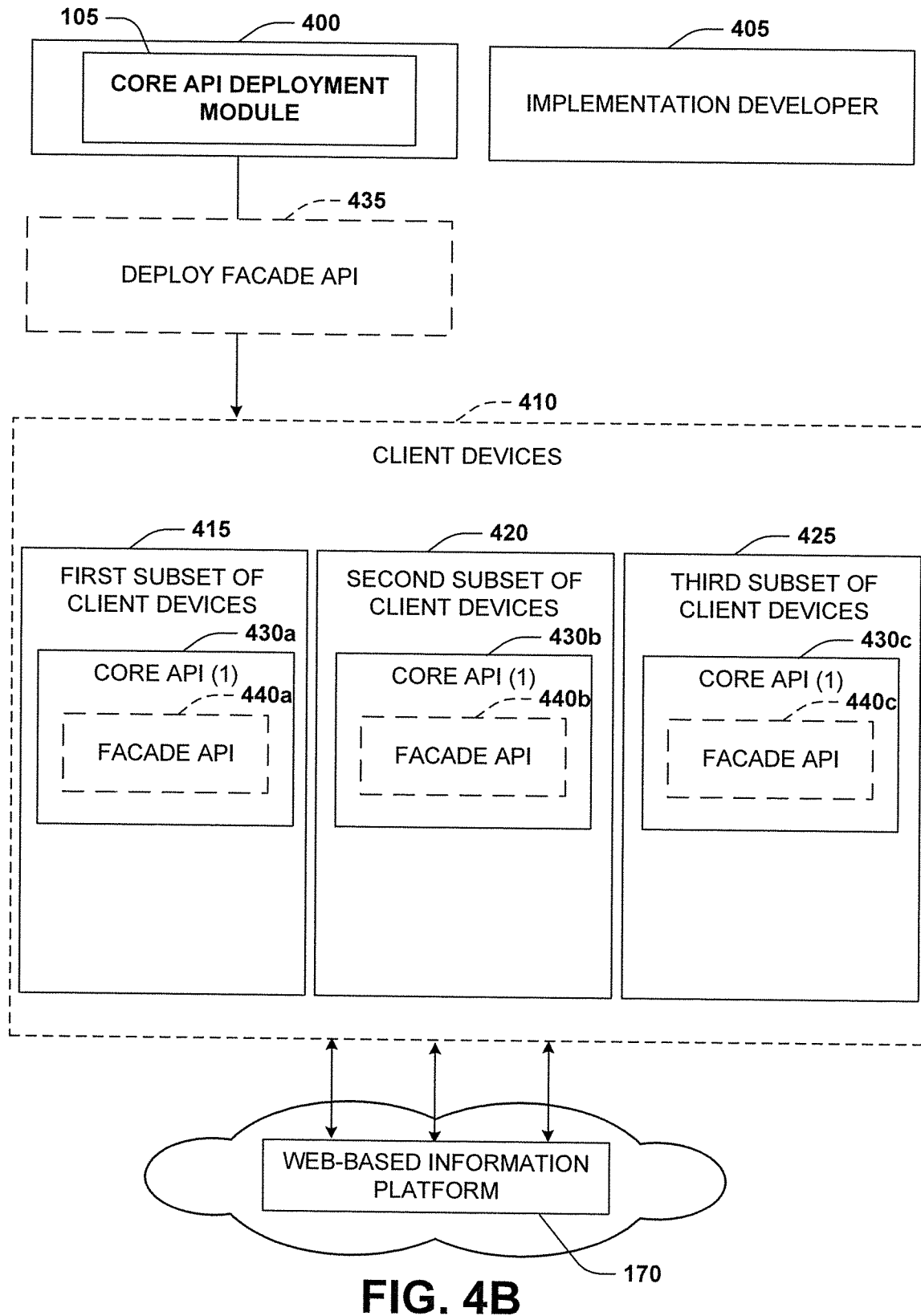
FIG. 4B illustrates an embodiment of a system associated with using a facade of a second core API, where the facade API is deployed.

The core API deployment module 105 is configured to deploy 435 facade API(s) 440a,b,c into instances of the first core API(s) 430a,b,c hosted on the plurality of remote client devices 410, as illustrated in FIG. 4B. The facade API(s) 440a,b,c are a placeholder for the functionality 465a,b,c provided by the second core API(s) 460a,b,c. In one embodiment, the facade API(s) 440a,b,c have a facade method having a method name that is the same as a method provided by the functionality 465a,b,c, such as a method name of a sendSocialNetworkMessage( ) method provided by the functionality 465a,b,c. However, the facade method may not provide the actual method code of the sendSocialNetworkMessage( ) method. In one embodiment, the facade method may merely return an indication that the sendSocialNetworkMessage( ) method is not yet implemented and thus no a social network message will be sent to a shopper. In another embodiment, the facade method may merely return a success indication that the social network message was sent even though no message was actually sent by the facade method.

Figure 4C:
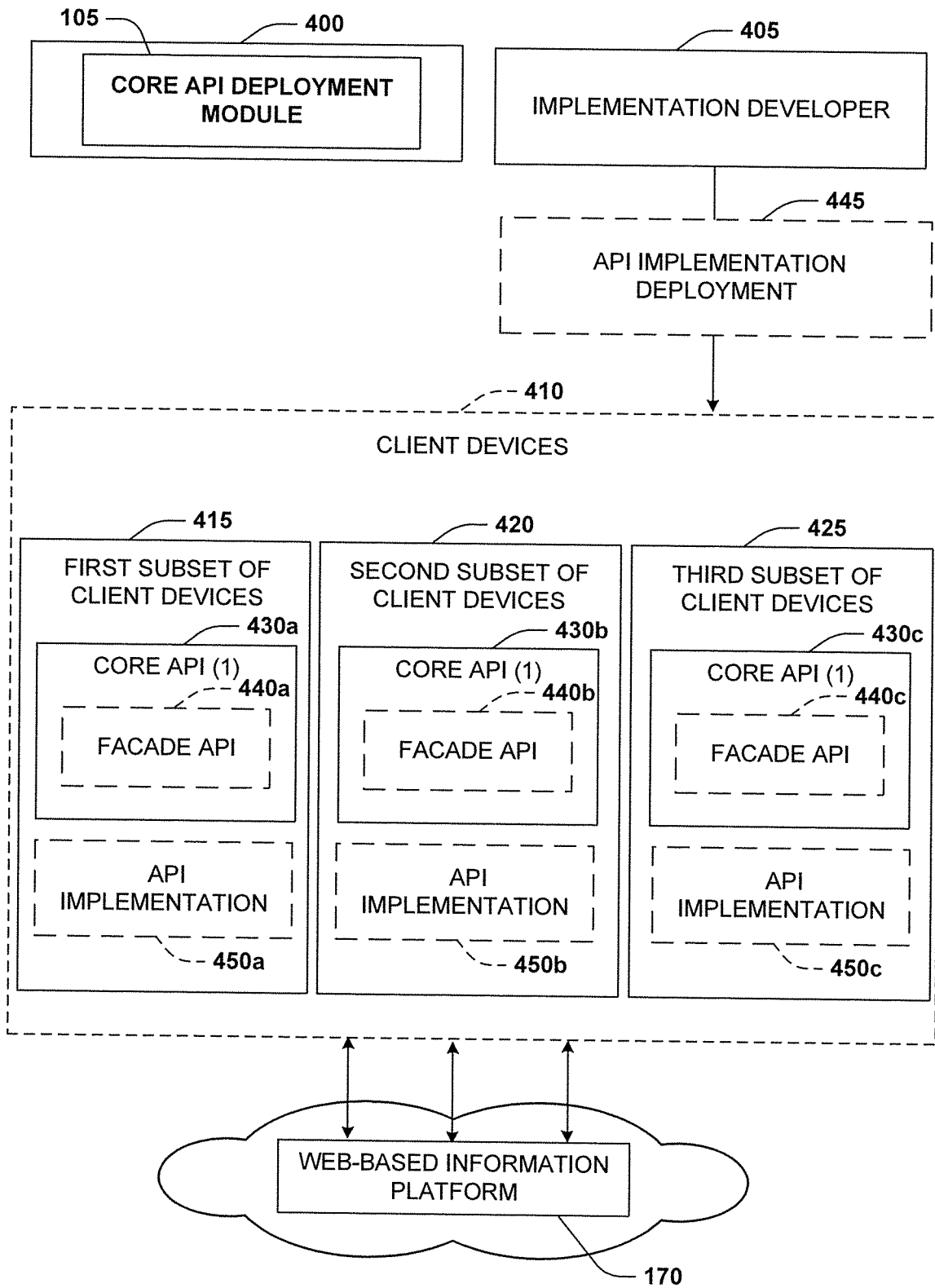
FIG. 4C illustrates an embodiment of a system associated with using a facade of a second core API, where an API implementation is deployed.

The implementation developer 405 may deploy 445 the API implementation(s) 450a,b,c to the plurality of remote client devices 410, as illustrated in FIG. 4C. Because the plurality of remote client devices 410 are hosting the first core API(s) 430a,b,c having the facade API 410, and are not yet hosting the second core API(s) 460a,b,c with the functionality 465a,b,c calls by the API implementation(s) 450a, b,c to the functionality 465a,b,c such as the sendSocialNetworkMessage( ) method will be processed by the facade API(s) 440a,b,c such as by the facade method that may return the indication that the sendSocialNetworkMessage( ) method is not yet implemented.

Figure 4D:
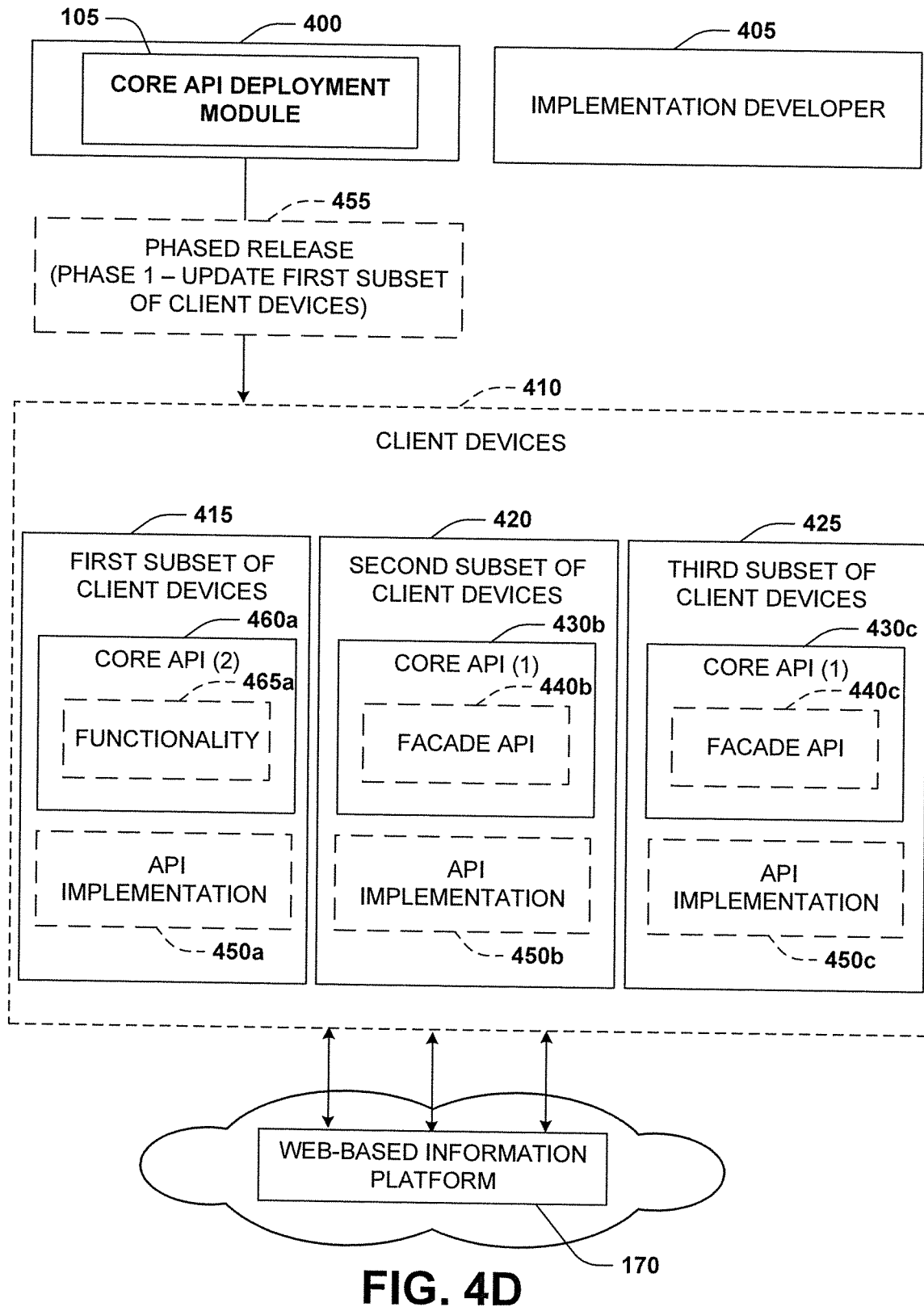
FIG. 4D illustrates an embodiment of a system associated with using a facade of a second core API, where a first phase is performed.
Figure 4E:
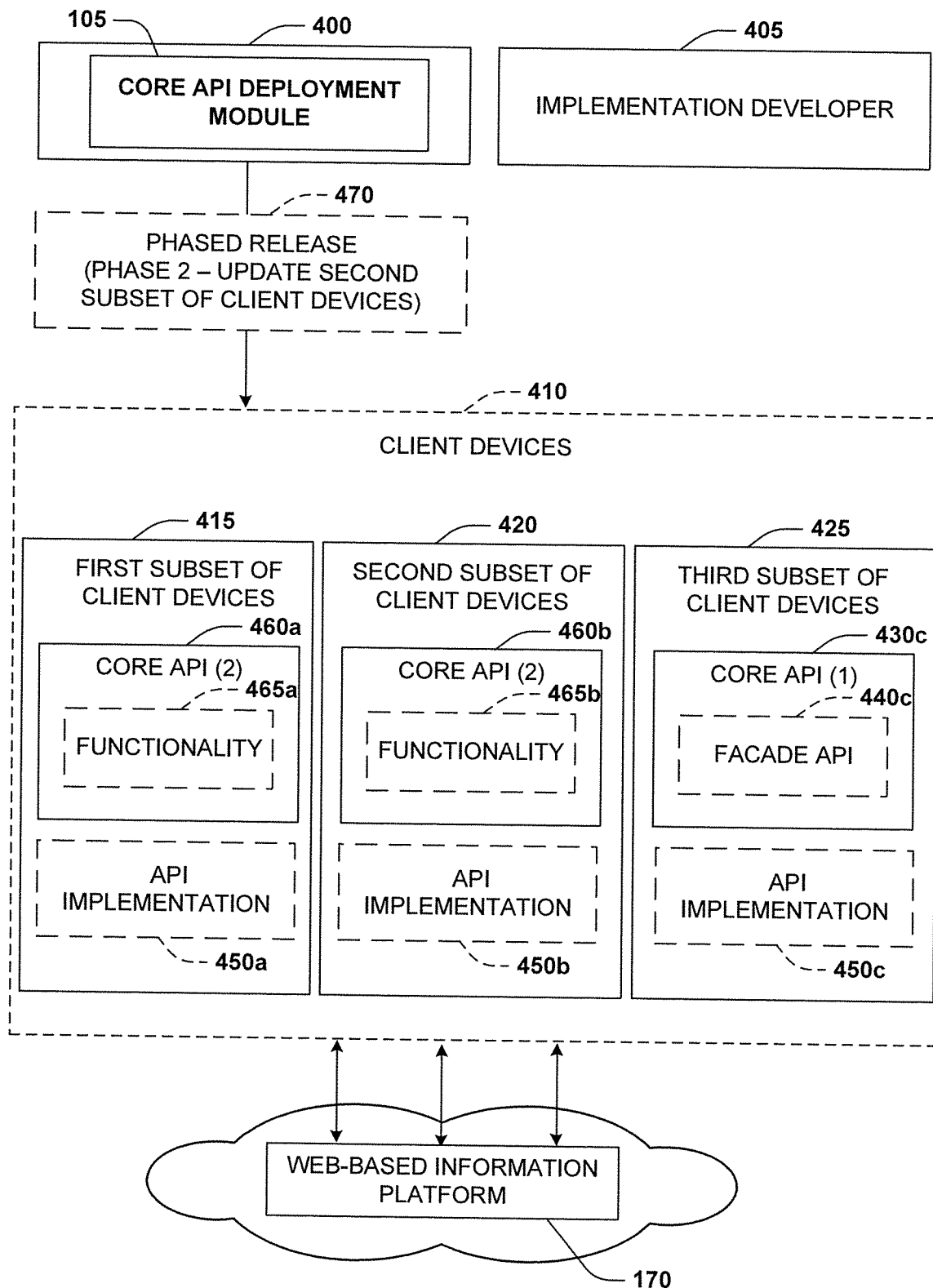
FIG. 4E illustrates an embodiment of a system associated with using a facade of a second core API, where a second phase is performed.
Figure 4F:
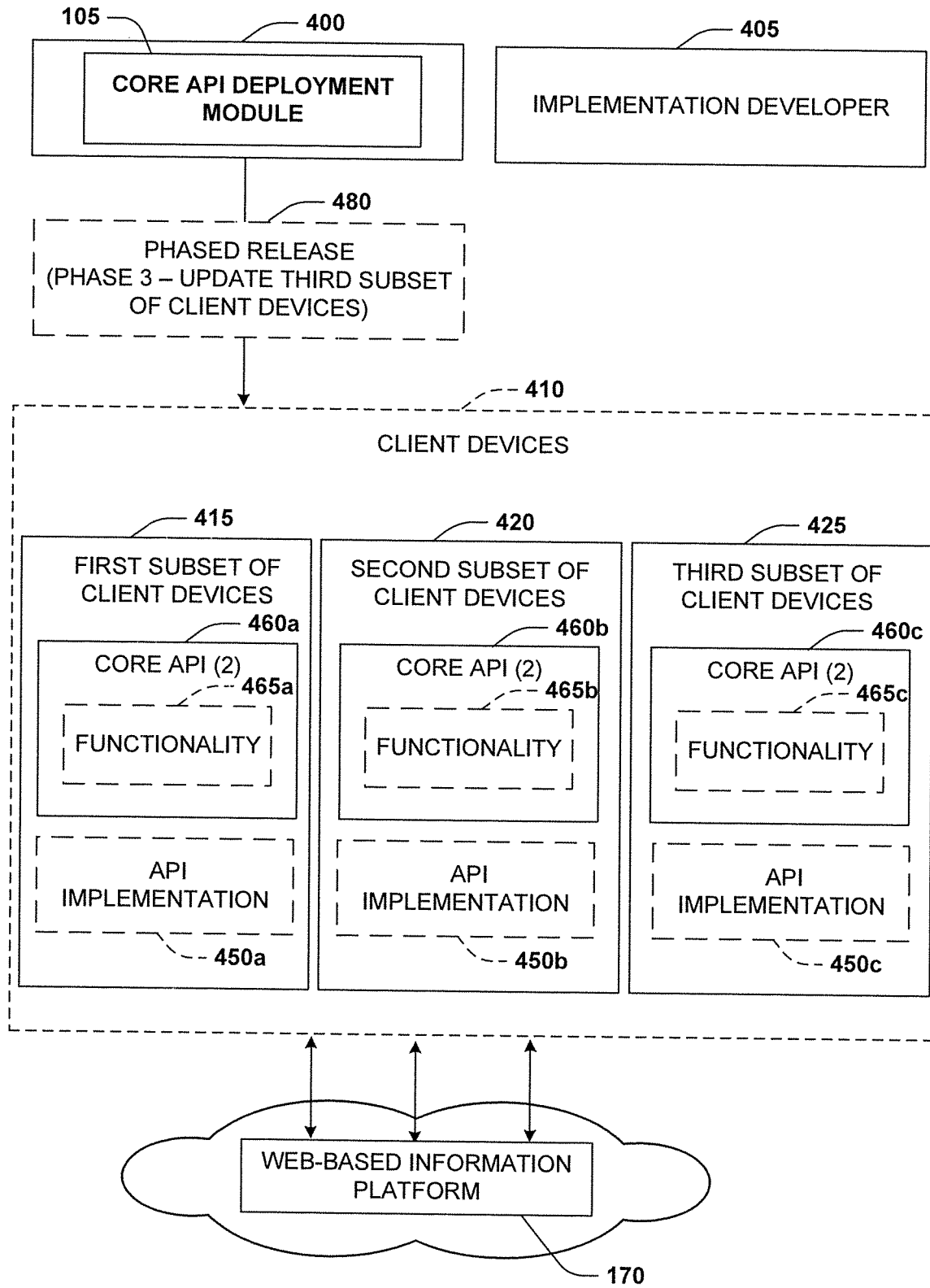
FIG. 4F illustrates an embodiment of a system associated with using a facade of a second core API, where a third phase is performed.

The core API deployment module 105 performs a first phase 455 of the phased release to upgrade the first subset 415 of the plurality of remote client devices 410 from the first core API 430a to the second core API 460a having the functionality 465a used by the API implementation 450a, as illustrated by FIG. 4D. In this way, instances of the API implementation 450a at the first subset 415 of the plurality of remote client devices 410 will be able to access and invoke the functionality 465a, such as the actual sendSocialNetworkMessage( ) method for sending social network messages to shoppers. Instances of the API implementation(s) 450b,c at the second subset 420 and the third subset 425 of the plurality of remote client devices 410 are merely able to access the facade API(s) 440b,c, and thus are not fully functional.

The core API deployment module 105 performs a second phase 470 of the phased release to upgrade the second subset 420 of the plurality of remote client devices 410 from the first core API 430b to the second core API 460b having the functionality 465b used by the API implementation 450b. In this way, instances of the API implementation 450b at the first subset 415 and the second subset 420 of the plurality of remote client devices 410 will be able to access and invoke the functionality 465b, such as the actual sendSocialNetworkMessage( ) method for sending social network messages to shoppers. Instances of the API implementation 450c at the third subset 425 of the plurality of remote client devices 410 are merely able to access the facade API 440c, and thus are not fully functional.

The core API deployment module 105 performs a third phase 480 of the phased release to upgrade the third subset 425 of the plurality of remote client devices 410 from the first core API 430c to the second core API 460c having the functionality 465c used by the API implementation 450c. In this way, instances of the API implementation 450a,b,c at the first subset 415, the second subset 420, and the third subset 425 of the plurality of remote client devices 410 will be able to access and invoke the functionality 465c, such as the actual sendSocialNetworkMessage( ) method for sending social network messages to shoppers.

Figure 5:
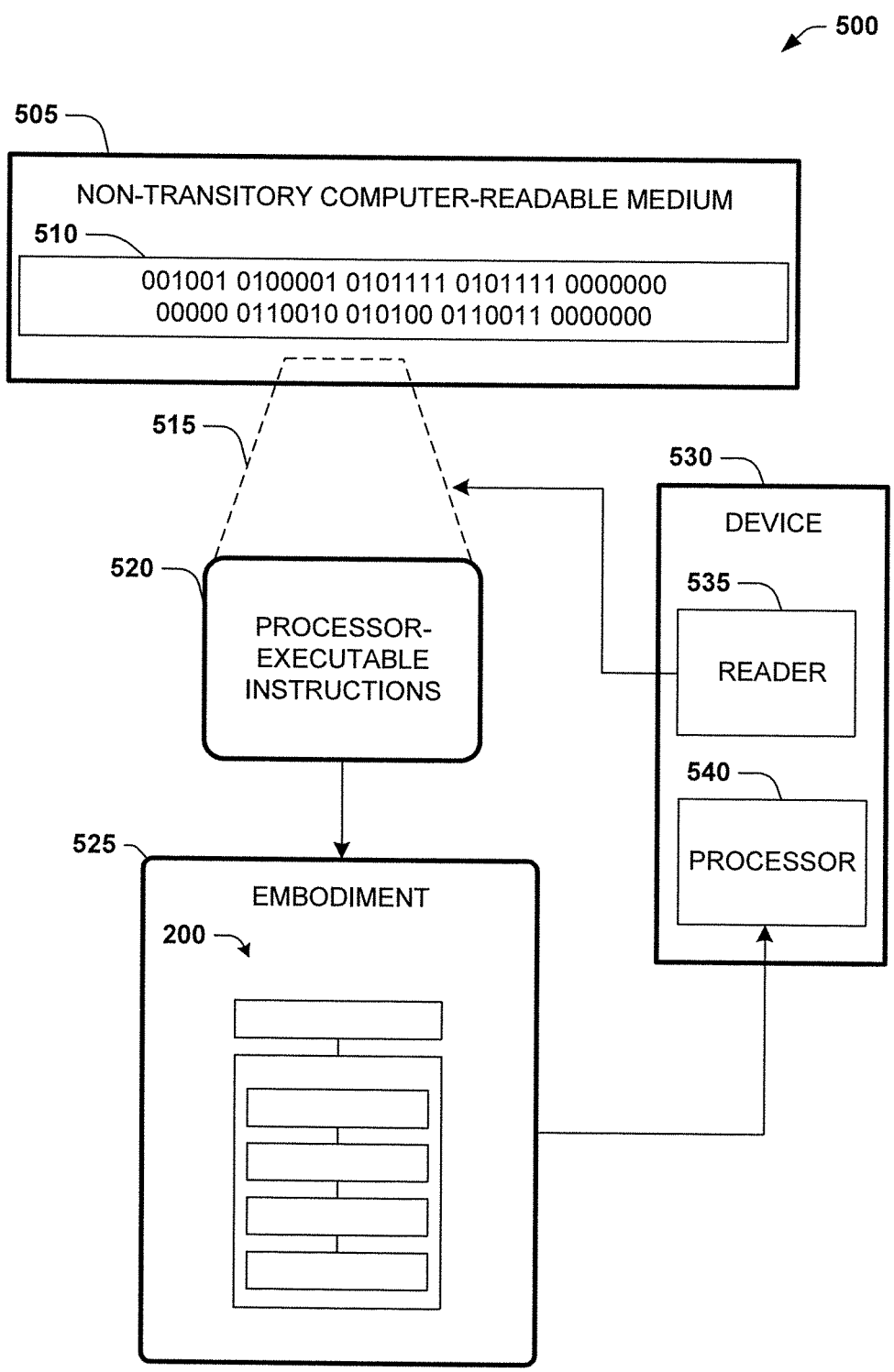
FIG. 5 illustrates an embodiment of a non-transitory computer-readable medium.

FIG. 5 is an illustration of a scenario 500 involving an example non-transitory computer-readable medium 505. In one embodiment, one or more of the components described herein are configured as program modules, such as the core API deployment module 105, stored in the non-transitory computer-readable medium 505. The program modules are configured with stored instructions, such as processor-executable instructions 520, that when executed by at least a processor, such as processor 540, cause the computing device to perform the corresponding function(s) as described herein. In one embodiment, the, functionality of the core API deployment module 105, stored in the non-transitory computer-readable medium 505, may be executed by the processor 540 as the processor-executable instructions 520 to perform an embodiment 525 of the method 200 of FIG. 2.

The non-transitory computer-readable medium 505 includes the processor-executable instructions 520 that when executed by a processor 540 cause performance of at least some of the provisions herein. The non-transitory computer-readable medium 505 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 505 stores computer-readable data 510 that, when subjected to reading 515 by a reader 535 of a device 530 (e.g., a read head of a hard disk drive, or a read operation invoked on a solid-state storage device), express the processor-executable instructions 520.

In some embodiments, the processor-executable instructions 520, when executed cause performance of operations, such as at least some of the example method 200 of FIG. 2, for example. In some embodiments, the processor-executable instructions 520 are configured to cause implementation of a system, such as at least some of the example system 100 of FIG. 1, for example.

Figure 6:
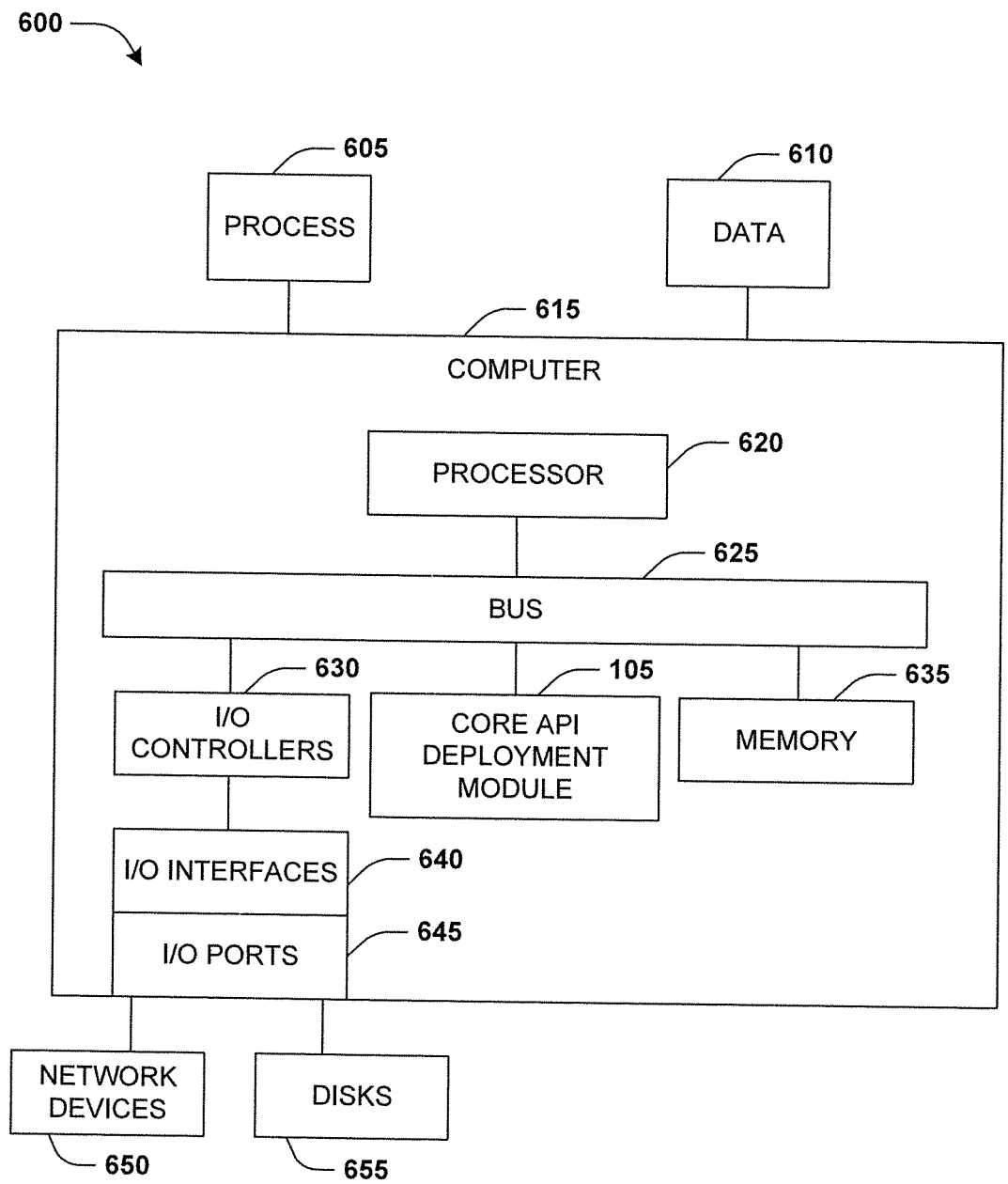
FIG. 6 illustrates an embodiment of a computing system configured with the example systems and/or methods disclosed.

FIG. 6 illustrates an example computing device 600 that is configured and/or programmed with one or more of the example systems and methods described herein, and/or equivalents. The example computing device 600 may be the computer 615 that includes a processor 620, a memory 635, and I/O ports 645 operably connected by a bus 625. In one embodiment, the, the computer 615 may include logic of the core API deployment module 105 configured to facilitate the system 100 and/or the method 200 shown in FIGS. 1-2. In different embodiments, the logic of the core API deployment module 105 may be implemented in hardware, a non-transitory computer-readable medium 605 with stored instructions, firmware, and/or combinations thereof. While the logic of the core API deployment module 105 is illustrated as a hardware component attached to the bus 625, it is to be appreciated that in other embodiments, the logic of the core API deployment module 105 could be implemented in the processor 620, stored in memory 635, or stored in disk 655.

In one embodiment, logic of the core API deployment module 105 or the computer 615 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the core API deployment module 105 may also provide means (e.g., hardware, non-transitory computer-readable medium 605 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least one processor of a computing system causes the processor to:
   perform a phased release to remote client devices to upgrade instances of a first core application programming interface (API) to a second core API associated with a web-based information platform, where the phased release comprises:
   in response to determining that an API implementation relies upon functionality of the second core API, deploy a facade API into the instances of the first core API, wherein the facade API is a dummy interface for interacting with the API implementation in place of the functionality of the second core API;
   wherein the dummy interface is configured to receive calls from the API implementation that request the functionality of the second core API to avoid producing an error that would be caused by the first core API not having the functionality requested, and wherein the dummy interface does not perform the functionality requested; and
   performing phased upgrades to upgrade subsets of the remote client devices in phases from the first core API to the second core API, wherein the functionality of the second core API replaces the facade API;
   wherein prior to deploying the facade API:
   determining that the API implementation calls a functionality of the second core API that is not part of the first core API; and
   identifying and selecting the facade API that is associated with the functionality to provide the dummy interface for interacting with the API implementation;
   wherein the facade API is configured to receive, from the API implementation, a requested action directed to the functionality, wherein the facade API does not perform the requested action but transmits (i) a success message to the API implementation to represent that the requested action was performed or (ii) returns an indication that the functionality is not yet implemented.

2. The non-transitory computer-readable medium of claim 1, wherein the instructions comprise instructions to:
   configure the facade API to respond to functional calls from the API implementation using a facade method having a method name matching a method name of a method comprised within the functionality.

3. The non-transitory computer-readable medium of claim 1, wherein the instructions comprise instructions to:
   configure the facade API to include a return function in place of a method body of a method comprised within the functionality, wherein the return function returns an indication that the functionality is not yet implemented.

4. The non-transitory computer-readable medium of claim 1, wherein the first core API is configured to access the web-based information platform, wherein the web-based information platform is hosted by a distributed cloud computing environment.

5. The non-transitory computer-readable medium of claim 1, wherein the instructions to perform the phased upgrade comprise instructions to:
   insert a method body of a method of the functionality into the facade API during upgrade of an instance of the first core API to the second core API.

6. The non-transitory computer-readable medium of claim 1, wherein the API implementation comprises a plugin for the second core API.

7. The non-transitory computer-readable medium of claim 1, wherein the instructions comprise instructions to:
   receive feedback from a remote client device upgraded to the second core API, wherein the feedback describes operation of the functionality of the second core API.

8. A computing system, comprising:
at least one processor connected to at least one memory; and
a core API deployment module stored on a non-transitory computer readable medium and configured with instructions that when executed by the at least one processor cause the at least one processor to:
perform a phased release to remote client devices to upgrade instances of a first core application programming interface (API) to a second core API associated with a web-based information platform, where the phased release comprises:
in response to determining that an API implementation relies upon functionality of the second core API, deploy a facade API into the instances of the first core API prior to the instances being upgraded, wherein the facade API is a dummy interface for interacting with the API implementation in place of the functionality of the second core API;
wherein the facade interface is configured to (i) receive calls from the API implementation that request the functionality to avoid producing an error and (ii) not perform the functionality requested; and
performing phased upgrades to upgrade subsets of the remote client devices in phases from the first core API to the second core API, wherein the functionality of the second core API replaces the facade API;
wherein prior to deploying the facade API:
determining that the API implementation calls a functionality of the second core API that is not part of the first core API; and
identifying and selecting the facade API that is associated with the functionality to provide the dummy interface for interacting with the API implementation;
wherein the facade API is configured to receive, from the API implementation, a requested action directed to the functionality, wherein the facade API does not perform the requested action but transmits (i) a success message to the API implementation to represent that the requested action was performed, or (ii) a message that the functionality is not yet implemented.

9. The computing system of claim 8, wherein the facade API is configured with an empty method body that does not perform the functionality requested by the API implementation.

10. The computing system of claim 8, wherein the instructions comprise instructions that cause the at least one processor to:
during the phased upgrade, utilize a first database schema of the first core API and a second database schema of the second core API for the web-based information platform.

11. The computing system of claim 8, wherein the instructions comprise instructions that cause the at least one processor to:
during the phased upgrade, upgrade the first core API with a database schema, programming code, and scripting code.

12. The computing system of claim 8, wherein the instructions comprise instructions that cause the at least one processor to:
facilitate deployment of the API implementation to the remote client devices before performance of the phased upgrade.

13. The computing system of claim 8, wherein the instructions comprise instructions that cause the at least one processor to:
configure the facade API to respond to functional calls from the API implementation using a facade method having a method name matching a method name of a method comprised within the functionality.

14. The computing system of claim 8, wherein the instructions comprise instructions that cause the at least one processor to:
configure the facade API to include a return function in place of a method body of a method comprised within the functionality, wherein the return function returns an indication that the functionality is not yet implemented.

15. A computer-implemented method, the computer-implemented method involving a computing device comprising a processor, and the computer-implemented method comprising:
performing, by the processor, a phased release to remote client devices to upgrade instances of a first core application programming interface (API) to a second core API associated with a web-based information platform, where the phased release comprises:
in response to determining that an API implementation relies upon functionality of the second core API, deploying, by the processor, a facade API into the instances of the first core API prior to the instances being upgraded, wherein the facade API is a dummy interface for interacting with the API implementation in place of the functionality of the second core API;
wherein calls from the API implementation that request the functionality of the second core API are intercepted by the façade API to avoid producing an error caused by the first core API not having the functionality requested, and wherein the facade interface does not perform the functionality requested; and
performing, by the processor, phased upgrades to upgrade subsets of the remote client devices in phases from the first core API to the second core API, wherein the functionality of the second core API replaces the facade API;
wherein prior to deploying the facade API:
determining that the API implementation calls a functionality of the second core API that is not part of the first core API; and
identifying and selecting the facade API that is associated with the functionality to provide the dummy interface for interacting with the API implementation;
wherein the facade API is configured to receive, from the API implementation, a requested action directed to the functionality, wherein the facade API does not perform the requested action but transmits (i) a success message to the API implementation to represent that the requested action was performed or (ii) returns an indication that the functionality is not yet implemented.

16. The computer-implemented method of claim 15, wherein the performing the first phase further comprises:
inserting a method body of a method of the functionality into the facade API during upgrade of an instance of the first core API to the second core API.

17. The computer-implemented method of claim 15, further comprising:

receiving feedback from a remote client device upgraded to the second core API, wherein the feedback describes operation of the functionality of the second core API.

18. The computer-implemented method of claim 15, further comprising:

configuring the facade API to include a return function in place of a method body of a method comprised within the functionality, wherein the return function returns an indication that the functionality is not yet implemented.

* * * * *